United States Patent [19]

Kohn

[11] Patent Number: 4,790,494
[45] Date of Patent: Dec. 13, 1988

[54] AIRCRAFT EMPENNAGE WITH FIXED TRAILING EDGE HORIZONTAL STABILIZER

[75] Inventor: Jerome S. Kohn, Plainview, N.Y.

[73] Assignee: Grumman Aerospace Corporation, Bethpage, N.Y.

[21] Appl. No.: 926,988

[22] Filed: Oct. 14, 1986

[51] Int. Cl.⁴ .............................................. B64C 5/02
[52] U.S. Cl. ..................................... 244/87; 244/214; 244/48
[58] Field of Search ...................... 244/214, 48, 87, 13, 244/89

[56] References Cited

U.S. PATENT DOCUMENTS

| | | | |
|---|---|---|---|
| D. 189,328 | 11/1960 | Thieblot | 244/87 |
| 1,451,352 | 4/1923 | Voracek | 244/13 |
| 1,533,323 | 4/1925 | McCauley . | |
| 1,652,618 | 12/1927 | Fairey . | |
| 1,691,376 | 11/1928 | Brimm, Jr. . | |
| 1,732,873 | 10/1929 | Yock | 244/214 |
| 1,873,662 | 8/1932 | O'Malley . | |
| 2,430,793 | 11/1947 | Wells . | |
| 2,563,757 | 8/1951 | Thorp . | |
| 2,953,322 | 9/1960 | Lewis | 244/48 |
| 3,417,946 | 12/1968 | Hartley | 244/87 |
| 3,756,529 | 9/1973 | Backlund et al. | 244/87 |
| 4,034,939 | 7/1986 | Ridley, Jr. et al. . | |

*Primary Examiner*—Galen L. Barefoot
*Attorney, Agent, or Firm*—Richard G. Geib; Daniel Jay Tick; Bernard S. Hoffman

[57] ABSTRACT

An aircraft empennage has a vertical stabilizer, a trailing edge fixed horizontal stabilizer rigidly attached to the aircraft and a movable leading edge elevator affixed to the aircraft. The elevator is movable through a high position and a low position relative to the horizontal stabilizer, thereby providing variable camber and incidence deflection and optimizing deflections while providing adequate power for all flight conditions.

9 Claims, 1 Drawing Sheet

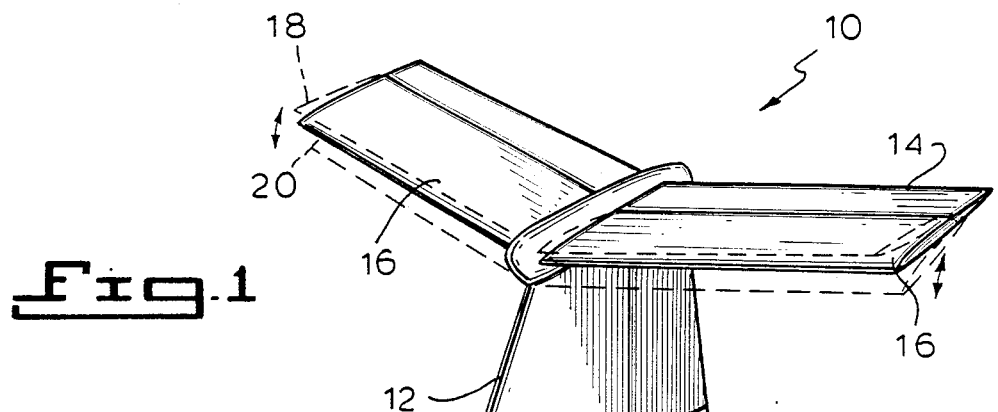
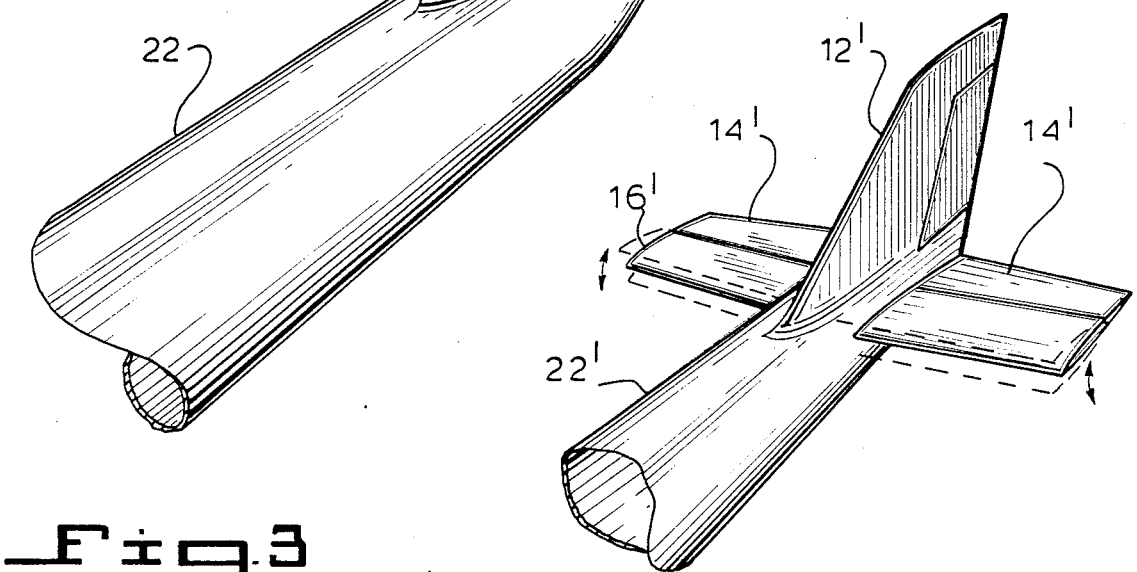
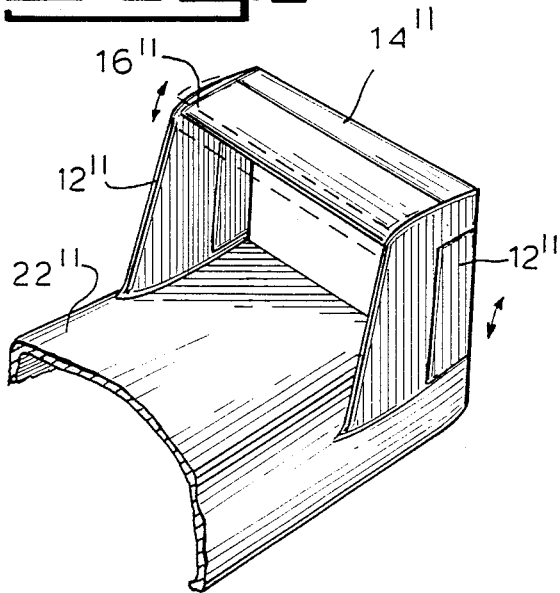
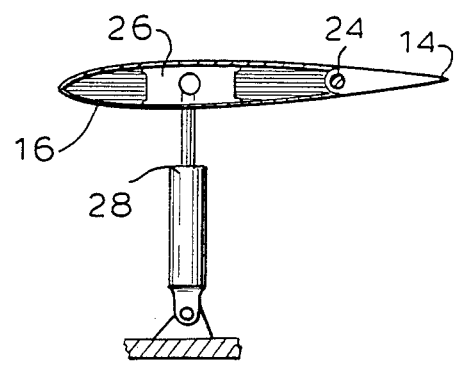

AIRCRAFT EMPENNAGE WITH FIXED TRAILING EDGE HORIZONTAL STABILIZER

BACKGROUND OF THE INVENTION

The present invention relates to an aircraft empennage. More particularly, the invention relates to an aircraft empennage having a trailing edge horizontal stabilizer fixedly affixed to the aircraft and a leading edge elevator movably affixed to the aircraft.

The horizontal portion of the empennage of a conventional airplane has two primary functions and is usually proportioned and designed to satisfactorily perform these functions. These two primary functions are the provision or maintenance of both static and dynamic longitudinal stability and the supplying of a sufficient force at the rear of the fuselage to rotate the airplane. The conventional elevator has a distinct tendency to float in the direction of the resultant wind at the tail of the airplane, so that there is a markedly reduced longitudinal stability when the controls are free, as opposed to being fixed. Furthermore, when an airplane equipped with the conventional horizontal stabilizer and elevator is landing, the forward portion of the horizontal stabilizer has an effect counter to that of the elevator, with the result that the conventional combination of the horizontal stabilizer and elevator is less efficient in the control of the landing attitude of the airplane.

BRIEF SUMMARY OF THE INVENTION

The principle object of the invention is to provide an aircraft empennage which overcomes the disadvantages of the prior art.

An object of the invention is to provide an aircraft empennage which is more efficient in the control of the landing attitude of an airplane than known empennages.

Another object of the invention is to provide an aircraft empennage having a rear facing fixed structure, aerodynamically smooth, for the installation of equipment requiring connection to other parts of the aircraft.

Still another object of the invention is to provide an aircraft empennage which is of simple structure, but effective, efficient and reliable in operation.

In keeping with these objects, and with others which will become apparent hereinafter, the aircraft empennage of the invention has a vertical stabilizer, a trailing edge horizontal stabilizer fixedly attached to the aircraft and a leading edge elevator movably affixed to the aircraft.

When the aircraft empennage of the invention with a trailing edge fixed relative to the fuselage is utilized, variable camber and incidence deflection are provided by the leading edge elevator, which optimizes deflections while providing adequate power for all flight conditions.

In accordance with the invention, an empennage for an aircraft comprises a vertical stabilizer affixed to the aircraft, a trailing edge horizontal stabilizer fixedly affixed to the aircraft and extending at an angle with the vertical stabilizer, and a leading edge elevator movably affixed to the aircraft and extending at an angle with the vertical stabilizer. The elevator is movable through a high position and a low position relative to the horizontal stabilizer, thereby providing variable camber and incidence deflection and optimizing deflections while providing adequate power for all flight conditions.

The aircraft has a fuselage and the vertical stabilizer extends from the fuselage, and the leading and trailing edges may extend from the vertical stabilizer or from the fuselage. The vertical stabilizer may have a single substantially vertical component or more than one spaced substantially vertical components.

Actuating means is coupled to the leading edge elevator for moving the elevator, and a tubular spar or other suitable structure is utilized for fixing the horizontal stabilizer in position.

BRIEF DESCRIPTION OF THE DRAWINGS

In order that the invention may be readily carried into effect, it will now be described with reference to the accompanying drawings, wherein:

FIG. 1 is a perspective view of a first embodiment of the empennage of the invention;

FIG. 2 is a perspective view of a second embodiment of the empennage of the invention;

FIG. 3 is a perspective view, on a reduced scale, of a third embodiment of the empennage of the invention; and FIG. 4 is a schematic diagram, in section, of the structure for supporting and controlling the empennage of the invention.

DETAILED DESCRIPTION OF PREFERRED EMBODIMENTS

Referring now to FIG. 1, the aircraft empennage 10 has a vertical stabilizer/rudder arrangement 12 to which is attached a fixed trailing edge horizontal stabilizer 14 extending at an angle with said vertical stabilizer. A leading edge elevator 16 is affixed to the vertical stabilizer/rudder arrangement 12 and extends at an angle with said vertical stabilizer. The elevator 16 is movable through a high position 18 (FIG. 1) and a low position 20 (FIG. 1), shown in broken lines, and any position intermediate thereof relative to the horizontal stabilizer 14.

In the embodiment of FIG. 2, the trailing edge fixed horizontal stabilizer 14' and the movable leading edge elevator 16' are affixed to the fuselage 22' of the aircraft.

In the embodiment of FIG. 3, the aircraft fuselage 22" has a pair of spaced vertical stabilizer components 12". A fixed position trailing edge horizontal stabilizer 14" extends between, and is affixed to, the tops of the vertical stabilizer components 12" and the leading edge variable position elevator 16" extends between said vertical stabilizer components 12".

FIG. 4 shows a structure for supporting and controlling the empennage of the invention. In FIG. 4, a tubular spar 24 affixes the horizontal stabilizer 14 in fixed position. An actuator 28 is coupled to a box beam 26 for raising and lowering the variable leading edge elevator 16.

The present invention provides variable camber and incidence deflection with one movable control. The movable control optimizes deflections, while providing adequate power for all flight conditions.

It will be understood that each of the elements described above, or two or more together, may also find a useful application in other types of methods and constructions differing from the types described above.

Although shown and described in what are believed to be the most practical and preferred embodiments, it is apparent that departures from the specific methods and designs described and shown will suggest themselves to those skilled in the art and may be made without departing from the spirit and scope of the invention. I, therefore, do not wish to restrict myself to the particular constructions described and illustrated, but desire to avail myself of all modifications that may fall within the scope of the appended claims.

I claim:

1. An empennage for an aircraft having a fuselage, comprising:
   (a) a vertical stabilizer having an upper portion and being affixed to the fuselage of the aircraft; and
   (b) an aerodynamically smooth horizontal stabilizer having a length and including a fixed trailing edge portion with a forward facing edge having a length and a movable leading edge portion with an aft facing edge having a length, said length of said forward facing edge of said fixed trailing edge portion and said length of said aft facing edge of said movable leading edge portion being substantially equivalent to each other and to said length of said horizontal stabilizer, said fixed trailing edge portion being fixedly attached to said upper portion of said vertical stabilizer and said aft facing edge of said movable leading edge portion being pivotally mounted to said forward facing edge of said fixed trailing edge portion allowing said movable leading edge portion to be movable relative to said fixed trailing edge portion without forming a gap therebetween so that air flows smoothly from said movable leading edge portion to said fixed trailing edge portion with minimal boundary layer separation and turbulence so as to provide the aircraft with increased static and dynamic longitudinal stability and increased landing attitude control.

2. An empennage as defined in claim 1; further comprising means for actuating said movable leading edge portion of said horizontal stabilizer.

3. An empennage as defined in claim 1; further comprising a tubular spar for pivotally mounting said movable leading edge portion of said horizontal stabilizer to said fixed trailing edge portion of said horizontal stabilizer.

4. An empennage for an aircraft having a fuselage, comprising:
   (a) a vertical stabilizer affixed to the fuselage of the aircraft; and
   (b) an aerodynamically smooth horizontal stabilizer having a length and including a fixed trailing edge portion with a forward facing edge having a length and a movable leading edge portion with an aft facing edge having a length, said length of said forward facing edge of said fixed trailing edge portion and said length of said aft facing edge of said movable leading edge portion being substantially equivalent to each other and to said length of said horizontal stabilizer, said fixed trailing edge portion being fixedly attached to the fuselage of the aircraft and said aft facing edge of said movable leading edge portion being pivotally mounted to said forward facing edge of said fixed trailing edge portion allowing said movable leading edge portion to be movable relative to said fixed trailing edge portion without forming a gap therebetween so that air flow smoothly from said movable leading edge portion to said fixed trailing edge portion with minimal boundary layer separation and turbulence so as to provide the aircraft with increased static and dynamic longitudinal stability and increased landing attitude control.

5. An empennage as defined in claim 4; further comprising means for actuating said movable leading edge portion of said horizontal stabilizer.

6. An empennage as defined in claim 4; further comprising a tubular spar for pivotally mounting said movable leading edge portion of said horizontal stabilizer to said fixed trailing edge portion of said horizontal stabilizer.

7. An empennage for an aircraft having a fuselage, comprising:
   (a) a pair of vertical stabilizers each having an upper portion and being affixed to the fuselage of the aircraft; and
   (b) an aerodynamically smooth horizontal stabilizer having a length and including a fixed trailing edge portion with a forward facing edge having a length and a movable leading edge portion with an aft facing edge having a length, said length of said forward facing edge of said fixed trailing edge portion and said length of said aft facing edge of said movable leading edge portion being substantially equivalent to each other and to said length of said horizontal stabilizer, said fixed trailing edge portion being fixed attached to and spanning between said each upper portion of said pair of vertical stabilizers and said aft facing edge of said movable leading edge portion being pivotally mounted to said forward facing edge of said trailing edge portion allowing said movable leading edge portion to be movable relative to said fixed trailing edge portion without forming a gap therebetween so that air flows smoothly from said movable leading edge portion to said fixed trailing edge portion with minimal boundary layer separation and turbulance so as to provide the aircraft with increased static and dynamic longitudinal stability and increased landing attitude control.

8. An empennage as defined in claim 7; further comprising means for actuating said movable leading edge portion of said horizontal stabilizer.

9. An empennage as defined in claim 7; further comprising a tubular spar for pivotally mounting said movable leading edge portion of said horizontal stabilizer to said fixed trailing edge portion of said horizontal stabilizer.

* * * * *